US008651660B2

(12) United States Patent
Barzak et al.

(10) Patent No.: US 8,651,660 B2
(45) Date of Patent: Feb. 18, 2014

(54) TINTED POLYCARBONATE OPHTHALMIC LENS PRODUCT AND METHOD OF MANUFACTURE

(75) Inventors: Adam Ahmad Barzak, Anaheim, CA (US); Andrew John McKenzie, Long Beach, CA (US); David Mark Ambler, Ranchos Palos Verdes, CA (US)

(73) Assignee: Younger MFG. Co., Torrance, CA (US)

( * ) Notice: Subject to any disclaimer, the term of this patent is extended or adjusted under 35 U.S.C. 154(b) by 0 days.

(21) Appl. No.: 13/492,601

(22) Filed: Jun. 8, 2012

(65) Prior Publication Data

US 2013/0329184 A1 Dec. 12, 2013

(51) Int. Cl.
*G02C 7/02* (2006.01)

(52) U.S. Cl.
USPC ............ 351/159.56; 351/159.57; 351/159.62; 351/159.66

(58) Field of Classification Search
CPC .......... G02C 7/108; G02C 7/12; G02C 7/021; G02C 7/10; G02C 2202/16
USPC ............... 351/159.24, 159.27, 159.3, 159.31, 351/159.56, 159.57, 159.62, 159.66
See application file for complete search history.

(56) References Cited

U.S. PATENT DOCUMENTS

| | | | |
|---|---|---|---|
| 3,514,246 A | 5/1970 | Bianco, et al. | |
| 4,377,389 A | 3/1983 | Haddad et al. | |
| 4,812,142 A | 3/1989 | Brodmann | |
| 4,917,927 A | 4/1990 | Sakaitani et al. | |
| 5,051,309 A | 9/1991 | Kawaki et al. | |
| 5,227,222 A | 7/1993 | Ogawa et al. | |
| 5,428,409 A | 6/1995 | Silverstein | |
| 5,453,100 A | 9/1995 | Sieloff | |
| 5,975,695 A | 11/1999 | Baiocchi et al. | |
| 6,117,384 A | 9/2000 | Laurin et al. | |
| 6,328,446 B1 | 12/2001 | Bhalakia et al. | |
| 6,458,913 B1 | 10/2002 | Honigfort et al. | |
| 6,554,421 B1 | 4/2003 | Billard et al. | |
| 6,613,433 B2 | 9/2003 | Yamamoto et al. | |
| 6,733,543 B2 | 5/2004 | Pyles et al. | |
| 6,749,646 B2 | 6/2004 | Pyles et al. | |
| 6,807,006 B2 | 10/2004 | Nakagoshi | |
| 6,942,705 B2 | 9/2005 | Inoue et al. | |
| 7,506,976 B2 | 3/2009 | Baiocchi et al. | |
| 7,775,659 B2 | 8/2010 | Nesty | |
| 8,012,386 B2 | 9/2011 | Clerc | |
| 2007/0285615 A1* | 12/2007 | Yamamoto et al. | 351/163 |
| 2009/0135462 A1* | 5/2009 | Kumar et al. | 359/243 |
| 2010/0012262 A1* | 1/2010 | Hsu | 156/245 |
| 2011/0037943 A1* | 2/2011 | Watanabe et al. | 351/163 |

* cited by examiner

*Primary Examiner* — Darryl J Collins
(74) *Attorney, Agent, or Firm* — Sheppard, Mullin, Richter & Hampton LLP

(57) ABSTRACT

The present invention describes ophthalmic lens products comprising a multilayer wafer and an injection-molded polycarbonate inner portion. The multilayer wafer includes a dyed, photochromic or polarized layer between a tinted inner layer and an outer polymeric layer. The inner layer may be solid or gradient-tinted. The polycarbonate inner portion of the lens product is directly fused to the tinted inner layer of the multilayer wafer during injection molding. The invention further describes a method to produce a gradient-tinted polarized polycarbonate eyewear lens product by obtaining a multilayer wafer having an outer layer, an inner polycarbonate layer, and a polarized layer between the inner and outer layers, applying a gradient tint to the wafer's inner layer, placing the gradient tinted wafer within an injection-molding cavity, and injecting molten polycarbonate directly against the wafer's gradient-tinted layer to form the inner portion of the lens product and to fuse it to the wafer.

20 Claims, 2 Drawing Sheets

TINTED POLYCARBONATE OPHTHALMIC LENS PRODUCT AND METHOD OF MANUFACTURE

CROSS-REFERENCE TO RELATED APPLICATION

Not applicable.

FEDERALLY SPONSORED RESEARCH OR DEVELOPMENT

Not applicable.

JOINT RESEARCH AGREEMENT

Not applicable.

SEQUENCE LISTING

Not applicable.

BACKGROUND OF THE INVENTION

1. Field of the Invention

The field of the invention relates generally to ophthalmic lens products and more specifically to lenses and lens blanks for eyewear, the lenses preferably having a gradient tint that varies across the lens.

2. Description of the Related Art

Ophthalmic lenses are commonly used to correct vision errors, aberrations and focusing deficiencies caused by age, disease or other factors. In addition to correcting physiological vision problems, ophthalmic lenses and eyewear may also be used to ameliorate physical or environmental conditions (such as glare, variable lighting, high intensity light, dust, condensation, etc.) that can affect sight. Eyewear may also incorporate aesthetic features for fashion and style.

Gradient tints may be added to ophthalmic lenses for both fashion and function. Tint and polarization are often used to attenuate light exposure. At minimum, such attenuation can be soothing to eyes subjected to too much light intensity. In addition, selective filtering via tint or polarization may aid in sharpening contrast and allow better discrimination of objects or features. Linearly polarized lenses offer the additional and unique advantage of specifically blocking blinding glare caused by directional reflection and illumination.

To tint lenses, they are often dipped or submerged in dye tanks. Gradient tinting of eyewear lenses requires more precise, reproducible processing than solid tinting. This is due to the necessity to color match the left and right lenses in an eyeglass frame and to make sure that the positioning of the color or intensity variation is consistent on both lenses.

Unfortunately, many thermoplastic polymers, and particularly the popular polycarbonate lens material, absorb dyes from solution very poorly. Many of the common dyes are dissolved in water for ease of use, but polycarbonate tends to be hydrophobic. Many common organic solvents dissolve, discolor or structurally weaken polycarbonate and therefore may not offer viable alternative routes to introduce dyes. Additives such as surfactants, emulsifiers or various less-active organic solvents may improve dye absorption, but further improvements are still desired.

While additives may allow sufficient absorption of the dye into the polycarbonate to provide the desired color or attenuation initially, the dyes may be unstable to continued light exposure and may fade or migrate with time. The dyes may also be dissolved or removed during the subsequent hard coating process that is applied to polycarbonate lenses. Oversaturation of material tinting may allow sufficient color to remain in the final lens, but solution of the excess dye can unacceptably contaminate the coating process. Thus, alternative approaches to dye tanks have been sought.

Adding dye to the stock resin for polycarbonate injection-molding does not allow the manufacturing freedom to create a variety of differently colored products. It can be expensive and time-consuming to purge colored material from the injection molding machinery prior to running other colors or clear material. In addition, and importantly, many dyes cannot withstand the high temperature and pressure of polycarbonate injection molding. Other dyes will not dissolve or disperse evenly within polycarbonate and therefore this approach is of limited application. In addition, if one wants a gradient tint across the surface of the molded lens, it cannot be easily accomplished with dyed resin.

An alternative approach to achieve a solid tinted thermoplastic lens is to place a pre-tinted or polarized wafer or insert in the injection-molding cavity, and join it to the molten polycarbonate during the injection molding process. One significant problem with this approach is that the heat of the injection molding process may severely degrade the dyes. Burning or severe fading of the dyes in the gate areas where molten polycarbonate is first introduced is especially problematic. This problem is more severe with polycarbonate than with many other thermoplastic materials, due to the higher temperatures required for polycarbonate molding.

Another common problem is poor adhesion between the wafer or insert and the polycarbonate used for injection due to physical or chemical differences between these materials. This may occur even when the wafer or insert is made of polycarbonate because of the different processing the wafer or insert has undergone to form its polycarbonate sheet(s), in contrast to the pelletized material that is melted for injection molding. For example, it is not uncommon for the wafer or insert to be subjected to stretching, forming, dyeing, annealing or other processes prior to insertion into the mold cavity. It may also have a different molecular weight distribution, viscosity or different additives than the polycarbonate supplied for injection molding. For multilayer wafers, the necessary steps of lamination and/or treatment(s) for improved adhesion of these multilayer structures may create additional stresses within the wafer that reduce compatibility with the injected material.

U.S. Pat. No. 5,227,222 describes constructing a multilayer wafer with the improvement of placing an additional ink dissolution prevention layer on the inner surface to keep dye from dissolving into the thermoplastic molding material. However, extra layers increase the overall complexity and thickness of the final product, which may not be acceptable for eyeglass lenses. This additional complexity and cost is likewise pointed out in U.S. Pat. No. 6,117,384, which recommends using a single layer substrate due to the impracticality of multiple layers.

U.S. Pat. No. 8,012,386 describes a method of creating a gradient-tinted thermoplastic lens by a different approach involving the formation, from colored material, of a layer that decreases in thickness from its top to bottom edge, thus creating a varying tint down the part. This layer of varying thickness is then combined with another layer (with either no tint or a different tint) having complementary varying thickness (i.e., thicker at the bottom than the top) to give a constant total thickness over the whole lens. Such a configuration is not practical for prescription lenses because prescription lenses require thickness differences across the lens to create the vision correction lensing effect. In addition, this method requires multiple injection-molding steps to make the first colored layer with a wedge-like thickness, then change molding materials, and then form the second layer with a reversed wedge-like structure. Less involved manufacturing methods are desirable.

Thus, while several approaches have been suggested for tinting lenses or creating gradient tints, further improvements for such properties as robustness, ease of manufacture and practical application to a variety of ophthalmic lens configurations is desired.

SUMMARY OF THE INVENTION

The present invention provides a tinted or gradient-tinted ophthalmic lens or lens blank made by the following process: (a) tinting the inner polymeric layer of a multilayer wafer, (b) placing the outer, undyed polymeric layer of the multilayer wafer against a cooled mold cavity, and (c) injecting molten polycarbonate against the inner tinted surface to form the lens portion that will be positioned closest to the eye. The injection-molded polycarbonate is fused directly to the inner layer of the wafer during the injection-molding process.

In a preferred embodiment, the multilayer wafer comprises a polarized layer between the inner and outer layers of the wafer. In another preferred embodiment, the inner layer of the wafer comprises polycarbonate. In another preferred embodiment, the wafer further comprises photochromic materials. In another preferred embodiment, the wafer further comprises specific additives. In another preferred embodiment, the method further comprises applying one or more specific coatings to the lens product.

One preferred embodiment of the product of this method is a tinted polarized polycarbonate eyewear lens or lens blank comprising a multilayer wafer fused to an injection-molded inner lens portion, wherein the wafer comprises an outer transparent polymeric layer, a polarized layer and an inner tinted polymeric layer, and the inner lens portion comprises injection-molded polycarbonate that is fused directly to the tinted layer during the molding process. In a preferred embodiment, the inner layer of the wafer is gradient-tinted. In another preferred embodiment, the polarized layer comprises a linear polarizer aligned with its absorption axis positioned in the 0-180 (horizontal) axis, and the gradient tint is darkest at the top of the lens product. In another preferred embodiment, the inner layer of the wafer comprises polycarbonate. In another preferred embodiment, the wafer further comprises specific additives. In a preferred embodiment, the multilayer wafer further comprises photochromic materials. In another preferred embodiment, the polarized layer further comprises photochromic materials.

Another preferred embodiment of the tinted polycarbonate eyewear lens product further comprises additional coatings selected from the group consisting of hard coatings, anti-reflective coatings, photochromic coatings and light filtering coatings.

Another preferred embodiment is a gradient-tinted polycarbonate lens or lens blank comprising a multilayer wafer fused to an injection-molded inner lens portion, wherein the wafer comprises an outer transparent polymeric layer, a layer comprising dyed material, and an inner, gradient-tinted polymeric layer. The inner lens portion comprises injection-molded polycarbonate that is fused directly to the gradient-tinted layer during the molding process. In another preferred embodiment, the inner layer of the multilayer wafer comprises polycarbonate. In another preferred embodiment, the multilayer wafer further comprises photochromic materials. In another preferred embodiment, the dyed layer comprises photochromic materials.

Another preferred embodiment of the tinted polycarbonate lens product comprises a multilayer wafer with a polarized, photochromic and/or dyed layer, wherein the wafer further comprises additional layers to tailor optical performance.

DETAILED DESCRIPTION OF THE PREFERRED EMBODIMENTS

The invention is a method of forming a polycarbonate ophthalmic lens product comprised of a wafer or insert fused directly to molten polycarbonate during the injection molding process, wherein the molten polycarbonate contacts the surface of the wafer or insert that is dyed with a solid or gradient tint. The invention is also the product of this process, wherein the solid or gradient tint is not on an outer surface of the lens product, but becomes embedded within the thickness of the lens product.

For convenience of description, the term "gradient" or "gradient tint" is used to refer to the coloring of a lens by dyes, tints, pigments or other agents that create a gradual, visually detectable variation in the color or color intensity over an area of the lens. The use of "dye" or "tint" in the text does not imply a discrimination between these various agents, but indicates the general practice of coloring a material.

Figure 1:
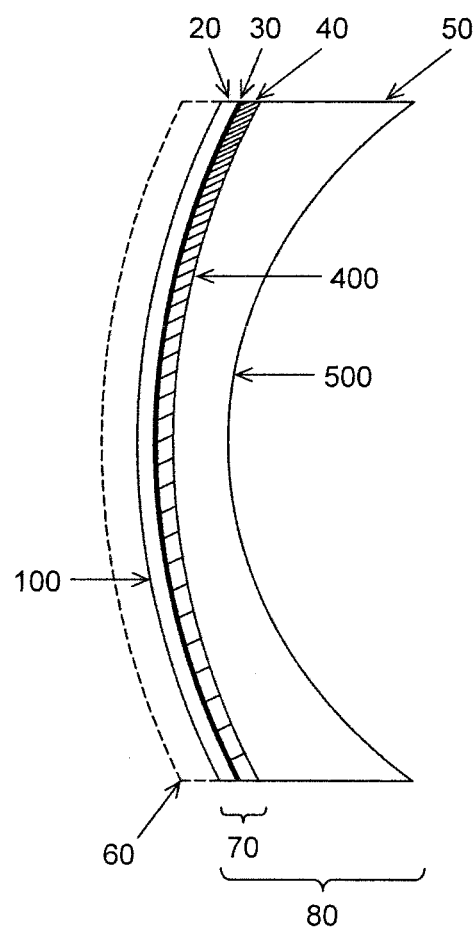
FIG. 1 shows a schematic side perspective view of a gradient-tinted, dyed or polarized polycarbonate lens blank according to a preferred embodiment.

For further convenience of description, "outer" designates the layer or a surface of a layer that is farther from the wearer's eye when the lens is in use as an ophthalmic lens. In addition, for convenience, "inner" designates a surface or layer closer to the wearer's eye when the lens is in use as an ophthalmic lens. In FIG. 1, surfaces 400 and 500 are each inner surfaces with respect to outer surface 100.

Ophthalmic lenses and lens blanks are optical products intended for use with the human eye, and may include products for spectacle or other eyewear frames, contact lenses and intraocular lenses. The preferred embodiments of this invention are ophthalmic lenses and lens blanks intended for eyewear frames, designated for convenience of description as "eyewear lens products." Eyewear frames for use with eyewear lens products include spectacle frames, goggles, helmets, visors or other structures designed to hold lenses in front of the user's eyes. Eyewear lens blanks are products that are made of materials and designs suitable for ophthalmic lenses, but are not in final form for a wearer's use. Lens blanks need to be further shaped or modified to produce a prescription or non-prescription optical power, or to fit within an eyewear frame. For example, many eyewear lens blanks have one surface that is curved suitably for mounting in eyewear frames and supplying some ophthalmic attributes, but the other, opposite surface needs to be ground and polished to complete the full prescription power required by the individual wearer. Such eyewear lens blanks are known in the art as semi-finished lens blanks. Often eyewear lenses or lens blanks are provided in larger diameters than many eyewear frames, such that they may be custom-edged down to the final shape and size needed to fit in a wearer's chosen frame.

Either wafers or inserts can be used in the invention. In typical injection molding configurations for ophthalmic lenses and lens blanks, the wafer or insert is placed against the "outer," cooled surface of the mold cavity.

Inserts are single layers or sheets of material typically made of polymeric materials, which are placed in the injection-molding cavity prior to introduction of the molten polycarbonate.

Wafers are typically a multilayer construct. The preferred wafer 70 in FIG. 1 comprises an outer layer 20, a dyed and/or polarized layer 30, and an inner layer 40. The layers of the wafer are joined by adhesive bonding or other physical or chemical bonding mechanisms known to those skilled in the art. The adhesive or bonding mechanisms between the layers are not shown in FIG. 1.

Typically, the inner and outer layers (indicated as 20 and 40 in FIG. 1) provide structure, protection and, optionally, additional optical properties to the construct. These layers may comprise polymeric layers, but extremely thin glass (sometimes called micro-glass) may also be used for one or more of the layers. Layers 20 and 40 may also comprise mixed organic and inorganic materials of crystalline, amorphous or polymeric structures, and may contain other additives to modify their optical, physical or chemical properties. For ophthalmic lens use, and particularly for eyewear lens products, these layers should be transparent. These transparent layers for ophthalmic lens products should exhibit low scatter and haze such that clear images may be seen when objects are viewed through them. In preferred embodiments, such transparent layers act as additional optical filters and may transmit significantly less than 100% of visible light.

In a preferred construct of the wafer, inner and outer transparent layers 20 and 40 each comprise polycarbonate. These polycarbonate layers may comprise the same or different polycarbonate polymers, and may include the same or different "other additives." In another preferred embodiment, the polycarbonate has been treated or modified to reduce stresses and birefringence of the layers.

The wafer 70 comprises a polarized or dyed layer 30, which preferably comprises a polymeric material. Polycarbonate or other polymers may be used, so long as reliable bonding or adhesion can be effected between the multiple layers of the wafer. For example, the polarized layer may comprise polyvinyl alcohol polymers and may further comprise iodine, dichroic dyes and/or other substances that can be aligned to create a polarizing effect.

While linear polarized layers are a preferred embodiment, wafers may also comprise circular, elliptical or variable polarization.

In another preferred embodiment, the polarized layer 30 may comprise photochromic materials, constant tints or dyes in addition to polarizing substances, as well as "other additives."

In an alternative preferred embodiment, a dyed layer 30 may comprise one or more photochromic materials, constant tints or dyes, with or without "other additives," instead of polarizing substances.

The "other additives" for any of these layers include materials such as dyes, tints, UV absorbers or reflectors, UV or thermal stabilizers, IR reflectors, visible light filters, selective light reflectors or absorbers and the like. The "other additives" may also include materials that modify the polymeric structure of a layer, altering its physical, optical or chemical properties for better performance as an ophthalmic lens. These other additives may also be included to increase the stability of the wafer or of a particular layer's properties, or to tailor them to a specific optical or physical performance. In another embodiment, such additives may be included in one or more of the adhesives (not shown) that join the layers of the wafer construct.

In another embodiment, the wafer may comprise additional layers besides those shown as 20, 30 and 40, wherein the added layers comprise substances, coatings or thin film interference coating stacks that tailor specific optical, chemical or physical performance. These added layers may comprise one or more of the "other additives" mentioned previously.

One example of an additional layer in the wafer 70 is indicated by layer 60 in FIG. 1. As an example, a hard coating may be placed on the outer polymeric layer of the wafer. In another example, a hard coating and a thin film interference coating stack to reduce reflection may be placed on the outer polymeric layer of the wafer. In another example, a thin film interference coating stack designed to create a spectral cut-off or notch in transmittance may be placed directly on one of the existing wafer layers such as those indicated in FIG. 1 by layers 20 or 40, added as a separate layer that is joined to an outer or inner layer of the wafer, or inserted as an additional layer within wafer 70. As another example, a thin film interference stack or other filtering layer(s) may be included in the wafer to effect the circular, elliptical or variable polarization mentioned previously. As another non-limiting example, a layer comprising a UV cut-off thin film interference coating stack could be incorporated in the wafer between layers 20 and 30, to attenuate UV exposure before light reaches dyed or polarized layer 30. In another non-limiting example, a moisture barrier layer or coating may be included in the multilayer wafer, and one preferred embodiment would include this as an outer layer 60, as shown in FIG. 1.

As another example, photochromic materials may be incorporated into the wafer in various layers or locations. As described above, they may be included in layer 30, with or without other dyes or polarizing substances. In addition, photochromic materials may be included in additional layers comprising wafer 70, such as optional layer 60, or a separate layer that is joined to inner or outer layers of the wafer. In another embodiment, if adhesive bonding is used to join the multiple layers of the wafer, the adhesive material may comprise photochromic materials.

In other embodiments, an insert may be used instead of a wafer. The structure would reduce to a single layer similar to layer 40, with an outer surface placed against the outer, cooled surface in the mold cavity, and its inner surface 400 in contact with the molten polycarbonate. An insert is designed to provide enhanced properties, such as, among others, UV blocking, visible tint, a more scratch-resistant outer surface, improved solvent resistance, and lower birefringence. In a preferred embodiment, an insert may comprise photochromic or polarization properties.

For ophthalmic lens and lens blank manufacturing, and particularly for eyewear lens products, a preferred embodiment is to use wafers and inserts that are pre-formed to spherical or more complex curvatures, including, among others, progressive, stepped bifocal and multifocal shapes. Such curvatures are designed to match or to approximate the desired curvatures of the molded lens product's outer surface, or provide an intermediate contour to reduce the magnitude and complexity of re-shaping that the wafer or insert may undergo as it is combined into the ophthalmic lens or lens blank. These curved wafers or inserts are then placed within the injection-molding cavity, and typically rest against the outer surface of the mold cavity. Alternatively, wafers or inserts may be flat. Such flat parts are cut to an appropriate size to fit the mold, and typically placed against the outer surface of the mold cavity. Various techniques known in the art, including vacuum, pressure, clamping, heating, etc. may be used to increase the conformity of the wafers or inserts (particularly flat wafers or inserts) to the mold cavity. While use of flat parts involves less processing steps and potentially less cost, preformed wafers and inserts are preferred and may provide significant advantages in optical quality, manufacturing efficiencies and yield.

Polycarbonate is often a preferred eyewear lens material due to its high impact resistance and light-weight in comparison to many other lens materials. Since previous lens materials were primarily thermoset polymers, new processing and manufacturing techniques were needed to be developed, learned and improved to create thermoplastic polycarbonate lenses of ophthalmic quality. Many of the differences and challenges inherent in polycarbonate lens manufacturing became even more apparent when polarized and tinted ophthalmic lenses, and particularly, the manufacture of such eyewear lens products, were attempted. The high heat of the polycarbonate injection molding process could destroy or significantly degrade the performance of dyes and polarizers, bleaching out the colors and reducing the polarization efficiency. As noted in the prior art, damage at the injection gates was especially problematic. U.S. Pat. No. 4,917,927 describes using thick ink deposition on the insert to lessen the perception of the damage, while U.S. Pat. No. 6,458,913 describes alternative, lower temperature thermoplastic materials to use instead of polycarbonate to reduce heat damage to decorative inserts or wafers.

An additional challenge was how to achieve a gradient tint on polycarbonate eyewear lens products. Gradient tinting can be accomplished by various methods known in the art. One preferred method is by controlled withdrawal from a dye bath. The withdrawal motion and frequency may be changed to create smooth or stepped gradient tints. Coating, painting or otherwise applying tinted solution to a surface of the part may also be used. In addition, the prior art outlines various dye bath additives as well as solvent mixtures that may aid in the challenging task of getting dyes to absorb and remain in or on the polycarbonate, without causing so much damage to the physical and optical properties of the polycarbonate matrix that it can no longer be used for ophthalmic lenses. Most of these methods focus on tinting the product only after the injection-molding process is complete, to avoid the heat damage associated with the molten polycarbonate introduction. Another preferred method for gradient tinting includes vacuum or gas phase coating deposition techniques.

Given these known problems, the inventors, based on the prior art and their own experience with the injection molding process, believed that dyeing the outer surface of a wafer (such as surface 100 in FIG. 1) would be the best method for applying a gradient tint to a polycarbonate lens or lens blank. This would position the gradient-tinted surface against the actively cooled mold surface and not in direct contact with the molten polycarbonate during the injection process. Surprisingly, they found that tint on this outer surface was unacceptably discolored, bleached and irregularly lightened during the injection molding process. The surface appeared crazed, with irregular mottling and unevenness of the surface. The dye was so weakly joined to the lens and its outer surface that it could be partially wiped off the lens.

In contrast, when the inventors dyed the inner surface 400 of wafer 70 (which was subsequently placed in direct contact with the molten polycarbonate during injection molding), the resultant lens or lens blank 80 was reproducibly and consistently tinted with the solid or gradient tint pattern that had been applied to the wafer. The damage to tinted outer surfaces and the success of only tinting the inner surface was confirmed by multiple experiments dyeing only the inner surface, or both surfaces, of wafers and subjecting these wafers to injection molding.

In addition, in the task of producing a gradient-tinted lens product, the inventors found that as long as the gradient-tinted surface of the wafer was placed toward the inner side of the lens (in contact with the molten polycarbonate), no marked difference in resultant gradient was observed regardless of which layer of the original wafer was gradient-tinted. That is, if surface 100 was gradient-tinted, but then the wafer 70 was turned inside out such that the gradient-tinted surface 100 was now in the position typically occupied by surface 400, its gradient tint was still preserved during contact with the molten polycarbonate and in the resultant lens. This was surprising because often the polycarbonate layers 20 and 40 on polarizing wafers each have different optical and physical properties. For instance, as U.S. Pat. No. 5,051,309 describes, the inner polycarbonate layer of a polarizing wafer may have very different birefringence or retardance than the outer layer. The two layers may also have different molecular weight distributions. The successful gradient tinting of either surface was surprising because it was suspected that such different polymeric properties could affect tint retention, compatibility with the molten polycarbonate, and optical quality of the final lens.

In addition, the inventors found that with this approach to solid or gradient tinting they were not restricted to using particularly high temperature dye compounds or unusual conditions for the dyeing process. Surprisingly, commercial dye bath solutions used for final tinting of finished polycarbonate lenses could be used in this invention as long as the solid or gradient tint was not placed on the outer surface (or absorbed into the outer layer) of the wafer or insert. This was quite surprising given the numerous prior art discussions of the difficulties of tinting polycarbonate. The inventors expected that even greater care and fewer dyes would be suitable since they must withstand the additional high heat of injection molding. However, the inventors found that extreme heat or extensive exposure was not required to drive the dyes or tints into the wafers.

In a preferred embodiment, the inventors applied solid or gradient tint to commercially available polarized wafers comprised of polycarbonate layers 20 and 40 adhesively bonded to a central layer 30 comprising linearly polarized polyvinyl alcohol film. These wafers are commercially supplied without additional hard coats on either layers 20 or 40, but both surfaces 100 and 400 are covered by static-held removable protective plastic sheets to prevent undue scratching during shipment and initial handling. These static-held protective sheets are typically removed shortly before molding, to maintain the wafers in a relatively clean and undamaged state, and prevent further pickup of dust, lint or dirt. In a preferred method, gradient tint was applied by controlled withdrawal of the wafer from a dye bath. Surprisingly, the inventors found that these static-held protective sheets successfully blocked dye pickup such that if a wafer was dipped into a dye bath with one surface covered by the static-held sheet, no dye appeared to be absorbed on the covered surface. Thus, the static-held sheet could be used as an aid in the tinting process: if left in place on layer 20, but removed from inner layer 40, only inner layer 40 would be tinted, as desired.

In the preferred embodiment, whether an insert or a wafer is employed, the solid or gradient tint is absorbed on or into layer 40 via exposure of surface 400 to dye(s). This positioning of the solid or gradient tint on the inner surface or within the inner layer of the wafer or insert has additional advantages beyond those already described above. Dyes and tints are often susceptible to photo-bleaching over time. Positioning these tints and dyes on an inner layer or surface can help increase their stability because total light exposure may be less due to the intervening layers. This is especially true when additives, dyes, tints, etc., or the intrinsic properties of the intervening layer(s) block some or all of the light exposure. It also means that one may not need to overload the original color in anticipation of fading. In addition, the dyed and/or polarized layer in the wafer may act as an efficient light filtering shield for this inner surface gradient. Positioning the dyes and tints on an inner surface or layer may also decrease the overall cost of the tinted product. Dyes and tints are often quite expensive. If the gradient is positioned on the inner surface or within the inner layer, it will need to temper only the light that has already passed through the other layer(s), not the total light flux. Thus, less dyes or tinting materials may be needed to effect a visible gradient effect since the task of filtering is shared by the other layers and their filtering properties. This is especially pertinent when layer 30 or the other components of wafer 70 comprise photochromic materials, which can actively reduce visible light exposure at least 50-85%, and may significantly reduce transmittance in the IR and UV regions, too.

In a preferred embodiment, a gradient tint rather than a solid tint is applied. The materials used to create the gradient tint may comprise dyes, tints, pigments, small particles or spheres, nanoparticles and the like.

In a preferred embodiment, the gradient tint is darkest at the edge that will be the upper extreme of the lens or lens blank as worn, and the tint gradually lightens as one progresses down the lens. This type of orientation is shown in FIG. 1 by the shading variation from top to bottom in layer 40. In another preferred embodiment, the gradient tint may be used to alter the color of the lens rather than significantly darken it. In such instances, one may choose whether the color variation proceeds down or across the lens as worn. In other embodiments, other gradient effects may be created by varying the density or hue of the color at other angles across the lens. This could be used for fashion effects in dress or wrap frames, or for providing darker regions on the lens if a specific activity generates known positions of higher light exposure. A double gradient is another common option, often seen with a dark band at or near the top of the lens, lightening in tint toward the center of the lens, and then darkening again toward the bottom of the lens. Another variation of the double gradient may involve gradients of different colors applied to the top and bottom portions of the lens. Additional variations will be understood by those of skill in the art.

As illustrated in FIG. 1, the lens or lens blank 80 is formed when molten polycarbonate is injected against surface 400 of the gradient-tinted layer 40 of the wafer or insert and allowed to solidify into layer 50 in the normal course of an injection molding manufacturing process. This places the gradient-tinted layer 40 within the body of the lens or lens blank. Preferably, layer 50 is fused directly to layer 40 of wafer 70 during the injection-molding process. While another approach is to adhesively bond a previously-made lens or lens blank to the gradient-tinted layer, fusing the polycarbonate material directly to the gradient layer can provide a stronger bond, and a simpler manufacturing process. Surprisingly, the inventors found that this fusing of molten polycarbonate to the solid or gradient-tinted layer did not destroy the applied tint and could create eyewear lens products with good optical properties.

This technique can be used to produce both finished lenses and semi-finished lens blanks as eyewear lens products. As known in the art, finished eyewear lenses typically have the corrective power and suitable lens thicknesses for eyeglass frames, but need to be edged to the correct frame shape for mounting. In this instance, inner surface 500 is the innermost surface of the ophthalmic lens or lens blank. When the invention is used to produce a polycarbonate semi-finished eyewear lens blank 80, layer 50 will have additional thickness that is intended to be ground and polished ("finished") to precise prescription powers for individuals. Layer 50 may be finished to create monofocal, multifocal, progressive or other specialized lenses as needed, and in the process, material is selectively removed from layer 50. Surface 400 (except for edging to frame shape) is intended to remain undisturbed throughout the finishing process, thus maintaining the gradient tint of the invention. The final finished lens is edged and mounted in the individual's selected eyewear frame to provide the optical correction, light filtering and aesthetic effect desired.

Optionally, in a similar manner to the example shown with layer 60 in FIG. 1, additional layers may be placed on surface 500. Non-limiting examples of such optional layers include hard coatings, anti-reflective coatings, polarizing coatings, photochromic coatings, light filtering coatings that regulate or limit ultraviolet, infrared or visible transmission, moisture-barrier coatings, and other coatings or layers that modify the optical or mechanical properties of the lens. These exemplary optional layers may also be placed on the outer surface 100, or included as additional layers in the multilayer wafer.

In any of these embodiments, another advantage to applying the gradient only to the inner layer 40 is that this layer will be protected by layer 50 from subsequent lens operations. One common subsequent lens operation is hard coating of the lens via liquid application of a coating solution, and then curing and hardening of the coating. Such liquid applications often include organic solvents such as a carrier, matrix, or reactant for the coating materials, but there is a common problem that such solvents or coating solutions will dissolve tints and dyes out of the lens. This contaminates the coating solution for use on subsequent lenses, and in addition, may cause unacceptable particulate and defect marks on the coated lens. However, if only the inner layer 40 is gradient-tinted, the tinted surface or layer will have almost no contact with the coating solution since it is fused to the inner lens layer 50 and layer 50 covers the entire surface 400. In this manner, the gradient tint is protected and maintained intact during further lens processing.

Figure 2:
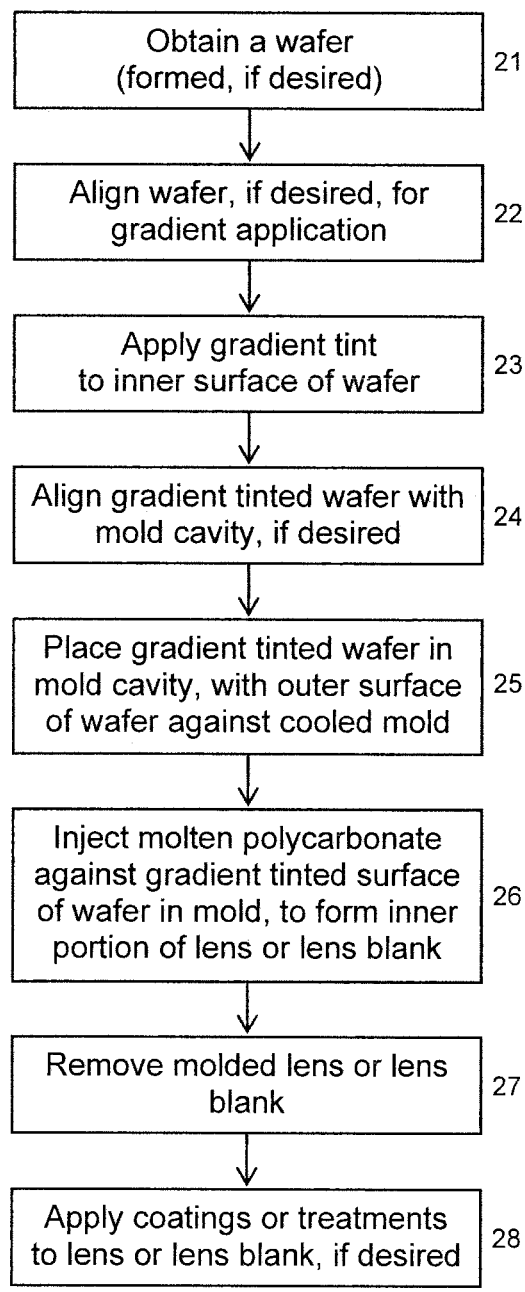
FIG. 2 is a flowchart illustrating the method of manufacturing a polycarbonate lens or lens blank with a gradient-tinted wafer according to a preferred embodiment.

FIG. 2 is a flowchart that illustrates the method of producing an exemplary lens or lens blank with a gradient-tinted wafer according to the invention. For further illustration and clarity, reference is made to numbered features of FIG. 1.

At step 21, a wafer 70 is obtained by purchase, custom build or modification, and is designed to provide desired optical or physical properties (besides the gradient tint). Examples of such properties include, among others, polarized or photochromic performance, constant dyes or tints, UV blocking, spectral filtering, a more scratch-resistant outer surface, improved solvent resistance, and lower birefringence. In this exemplary process, the layer 30 of the wafer may comprise polarizers, photochromic dyes, constant dyes or tints, and filters of UV, visible or IR light, with or without other additives. In a preferred embodiment, layer 30 comprises a high efficiency linear polarizer.

A preferred option is to obtain or create a formed wafer. Such a formed wafer is curved to fit more securely in the mold cavity than a flat sheet. In addition, the curve of a formed wafer may approximate some intermediate shape or provide a curvature close to or matched to the final shape of the outer lens surface. Examples of outer lens surface curvatures include spherical, aspherical, toroidal, stepped bifocal or multifocal, and progressive lens shapes, among others. Use of a formed wafer may increase reliability and repeatability of the molding process, and improve the optical properties of the final lens or lens blank (e.g., less variation in curvature value and less aberration across the lens).

Step 22 provides the option to align the wafer for desired gradient tint application. This can be accomplished by alignment of the wafer prior to and throughout the application of the gradient tint in a measured orientation relative to the gradient direction and the dye bath level.

If the wafer has been formed into a non-symmetrical shape, it may be preferred or necessary to align the gradient in a known orientation with the formed wafer shape or with its intended position in the final lens. Similarly, if the wafer has other properties that vary as a function of position on the wafer, it may be preferred or most effective to establish and maintain specific alignment of these features with the expected gradient.

Step 22 is particularly useful and preferred for wafers with a polarized layer 30. For example, linear polarizers in eyewear lens products are normally aligned to block light reflected from horizontal surfaces when the lens is mounted in the frames (the "as worn" position). In this alignment, the absorption axis is in the 0-180 degree position (horizontal axis), and this axis is indicated or marked for the user so proper alignment and effectiveness of the polarizer can be maintained during processing and mounting in the eyewear frame. One preferred combination of this polarizer alignment with a gradient tint is to position the gradient such that it decreases in darkness from the top to the bottom of the lens or lens blank when viewed in the "as worn" position. To achieve this alignment, one must determine the polarization axis prior to gradient tinting and maintain that alignment throughout the tinting process. The same alignment should be applied to each lens within established tolerances.

This approach can be successfully applied to other combinations of oriented wafers and desired alignments with gradient tints.

A gradient tint is applied to the inner transparent layer 40 of the wafer by exposing inner surface 400 to dyes at step 23. Preferably, the gradient tint should be applied to the inner surface or allowed to penetrate into layer 40 from the inner surface. More preferably, the outer surface 100 is protected during the gradient tinting process. Surprisingly, as noted previously, the inventors found that for various wafers with a polarized layer 30, the outer layer surface could be protected from dyeing by leaving the static-held sheet in place on surface 100. While it is recognized that all static-held sheets may not behave in the same manner, it does present an unexpected option for protecting the outer surface of the wafer from tinting.

The gradient is preferably embodied as a gradual change in the density or intensity of coloration. Another preferred embodiment is a gradual change in the color or hue of the tint. For example, one could create a gradient tint that progresses from yellow to green, red to blue, or other sets of colors by changing dyes or the application of dyes during the tinting process. In a preferred embodiment, the change in intensity of color or in hue progresses from one edge of the wafer to the other, for example, from top to bottom, or left to right.

Similar to step 22, step 24 provides the option to position the gradient-tinted wafer for proper alignment with or within the mold cavity, if alignment is needed or helpful to achieve a sufficiently reproducible lens or lens blank. In this step 24, the wafer may be oriented such that it has a known alignment with respect to the molds or to other features that will be found on the molded or final lens. For example, a mold may be created with identifying marks that are to appear at the top of each as-molded lens. If the desired gradient should be darkest at the top of the lens, the gradient-tinted wafer would be placed in the mold cavity such that the darkest region aligns with these mold marks. In another alignment example, it may be found that undesirable stress or flow lines from factors such as lens features or mold gates are created at known and reproducible locations during molding. It may have been determined that such defects are more easily and reproducibly removed, for example, by edging a few mm off the diameter of the lens after molding rather than by modifying the molding process. In such an instance, one may choose to align the gradient-tinted wafer in a known position relative to these features so that their location on the final product is more reproducible known and can be minimized.

For production of eyewear lens products, particularly for production with polarized gradient-tinted wafers and semi-finished lens blanks, it is most preferred to orient the wafer such that it has a known alignment with respect to the molds, or to other features that will be found on the molded or final lens. For example, if the eyewear lens or lens blank will have a non-spherical outer surface (e.g., a segmented multifocal surface, a progressive lens outer surface, or some other surface with changing curvatures), it may be important to align both the polarizer and its gradient tint with these curvature changes on the molding surface. In a preferred embodiment, the alignment tolerances at both steps 22 and 24 are considered and designed to allow production of an eyewear lens product with expected and acceptable optical and physical properties.

One optional alignment of the gradient-tinted wafer with the mold cavity is to position the lightest portion of the tinted wafer nearest the flow gates. This could minimize flow discoloration of the gradient tint. The inventors did not find this a necessary alignment in their process, but it may be a helpful option.

At step 25, the wafer with the gradient tint (aligned, if desired, from step 24) is placed into the injection mold cavity such that the outer surface 100 of the wafer rests against the outer, cooled surface of the mold cavity. This positions layer 40 and inner surface 400 with the gradient tint away from the outer surface of the mold cavity, and in a position to first encounter the molten polycarbonate during molding.

At step 26, molten polycarbonate is injected into the mold cavity and allowed to flow against the gradient-tinted surface of the wafer to form layer 50. Preferably, the molten polycarbonate fuses to layer 40 during the molding process. Layer 50 is the inner portion of the ophthalmic lens. When these steps are used to produce a semi-finished eyewear lens blank, layer 50 is the inner portion of the eyewear lens blank which will be ground and polished to the specific prescription and when mounted is positioned closest to the wearer's eye.

Typical temperature, pressure and timing conditions for injection molding of polycarbonate eyewear lens products are known in the art. The inventors found that no extreme process changes were required to prepare these lens products as long as the gradient tint was not on the outer surface.

The molded lens or semi-finished lens blank 80 is removed from the mold cavity at step 27.

Step 28 outlines optional additional actions of applying one or more coatings or treatments to one or more surfaces of the lens or lens blank (surfaces 100 and/or 500). Examples of optional applied coatings include hard coatings, minor coatings, anti-reflective coatings, hydrophobic coatings, photochromic coatings, polarizing coatings, light filtering coatings, and other coatings to tailor the optical, chemical or mechanical properties of the lens. Optional treatments may change the surface properties of the lens, and include such options as anti-fogging and ease of cleaning treatments. Such coatings or treatments may be applied to one or both of surfaces 100 and 500 as desired, convenient or needed, either alone or in combination with other coatings or treatments. When the steps of FIG. 2 are used to produce a semi-finished lens blank, it may be preferable to apply added coatings (like that indicated by 60 in FIG. 1) only to the outer surface 100 because the inner surface 500 will be removed or altered in subsequent preparation of the final corrective prescription lens. However, in some instances, it may still be preferable to coat both surfaces of a semi-finished lens blank for manufacturing convenience and ease of handling.

After step 27 and optional step 28, a lens or lens blank made by this method is ready for final inspection and/or packaging, or alternatively for final preparation for mounting in a chosen eyewear frame.

When the steps of FIG. 2 are used to produce a finished eyewear lens, an example of final preparation for mounting may involve aligning the gradient of the lens in the desired direction relative to the frame shape, edging the lens to the size and shape of the frame, and shaping the lens' edge thickness for aesthetics and for a secure frame fit.

When the steps of FIG. 2 are used to produce a semi-finished eyewear lens blank, more steps are involved in finishing the lens before mounting it in an eyeglass frame. These are known to those of skill in the art, and often involve careful alignment of the lens blank such that the correct optical and physical features as well as the corrective power regions are each properly positioned with respect to the lens frame. As another embodiment, additional coatings or treatments, including those described at step 28, may be applied during or after this finishing process has been performed.

The result of the invention described in FIG. 2 is an eyewear lens product with the desirable feature of a protected gradient tint added to the functionality of a polarized, photochromic or constant dyed polycarbonate lens.

FIG. 2 has illustrated the process to create a gradient-tinted wafer and incorporate it into an ophthalmic lens or lens blank. If a wafer with a solid tint is desired instead of a gradient tint, the same steps are followed except a solid tint is applied in step 23. Even with a solid tint, the optional alignment steps may still be employed if it is desired or preferred to align the wafer with mold features or flow characteristics.

While these discussions have illustrated the invention for a wafer or insert positioned on an outer surface of an ophthalmic lens or lens blank, the method and product with a protected tinted layer could also be constructed with the wafer or insert on the inner surface of the lens or lens blank. In this embodiment, the tint or preferably the gradient tint would be applied to the outer surface of the wafer or insert, the wafer or insert would be placed with its inner surface against the cooled mold, and molten polycarbonate would be injected against the tinted surface of the wafer or insert, in this case to form the outer portion of the lens or lens blank. This could be a preferred configuration when an eyewear lens product is being manufactured to final prescription power, or to a specific final optical power and lens shape. Again, according to the invention, an eyewear lens product is created with the added feature of a protected tint or gradient tint combined with the functionality of polarization, photochromic and/or dyed lens properties.

EXAMPLES

The invention will now be described in more specific detail with reference to the following non-limiting examples.

BPI (Brain Power Incorporated) lens preparation solutions, tints, lens holders and tinting systems were used for the Examples.

In these Examples, wafers were first immersed briefly in BPI Lens Prep II cleaning solution that was maintained at 190-200° F. (87.8° C.-93.3° C.).

A tint bath was prepared by combining Parts A & B of BPI Polycarbonate gray tint solutions in a BPI Production Master™ tint bath, stirring and heating the bath at a setting of 195° F. (90.56° C.), such that the bath was maintained within the range of 190-200° F. (87.8° C.-93.3° C.).

Wafers were placed in a BPI #66900 12 pair Lens Rack™ (24 piece lens holder) and were oriented such that the wafer's highest edge in the holder would be the bottom (lowermost) edge of the lens as worn. Wafers comprising linear polarized layers were further oriented such that the absorption axis of the polarizer was aligned in the 0-180 degree (horizontal axis) position.

The rack of wafers was lowered manually into the tint bath. The operator manually dipped the rack of wafers up and down in the tint bath for 5 minutes. In the dipping process, the lowermost edge of the wafers was not raised above the level of the tint bath, but the wafers were plunged deeper into the bath or raised partially out of it in a periodic manner. After a five minute dipping cycle, the racked wafers were rinsed in a deionized water bath to remove any tint particulates that might be resting on the wafers. This process of dipping and rinsing was repeated four times, with the operator intentionally choosing different dip and withdrawal speeds for each five-minute dipping cycle to smooth the appearance of the gradient tint progression. In addition, the operator closely monitored the tank temperature to assure that the mean temperature remained at 195° F. (90.56° C.) and did not fall below 190° F. (87.8° C.). After the four dipping and rinsing cycles, the racked wafers were rinsed thoroughly in the deionized water bath and unloaded from the rack.

Example 1

Round, 76 mm diameter linearly polarized gray polycarbonate wafers (product code YNG, Wintec International Japan, Inc.) for use in eyewear lens products were obtained with a nominal 6B spherical radius of curvature (the typical range of radii for these wafers is 84.8 mm to 86.8 mm). The construction of the original wafer layers and their removable sheets was as follows, starting from the outer surface:

static-held protective sheet//polycarbonate layer/polarizer layer/polycarbonate layer//static-held protective sheet.

The polycarbonate layers are adhesively joined to the polarizing layer in this wafer.

Both protective sheets on each wafer were removed. The wafers were mounted in the lens holder, immersed in the Lens Prep II solution for two minutes, and then dipped for gradient tinting using the four-cycle process described previously.

Visual inspection showed dye present on both sides of the wafers and a gradient tint pattern. The portion of each wafer that was deepest into the tint bath had the darkest tint. Due to the mounting orientation of the wafer in the holder, this darkest area corresponds to what would be the top of the lens as worn. The color of the tint was brownish gray.

The wafers showed unacceptably heavy crazing and microcracking of the surfaces. In addition, tint could be partially wiped off in the crazed areas. Wafers did not lose tint when wiped with a cloth moistened with isopropyl alcohol, but did release tint when wiped with propylene glycol monomethyl ether, a common solvent in lens coating solutions.

Example 2

A 6B wafer was prepared in the same manner as EXAMPLE 1, except the cleaning in the Lens Prep II solution was reduced to one minute in the 190-200° F. (87.8-93.3° C.) bath.

Visual inspection showed dye present on both sides of the wafer, and a gradient tint pattern. Significantly less crazing and micro-cracking of the surfaces was observed than for EXAMPLE 1.

Example 3

6B wafers were prepared as in EXAMPLE 2 with gradient tints on both the inner and outer surfaces of the wafer. The wafers were dried in air at 80° C. for one hour prior to molding.

A gradient-tinted wafer was placed against the outer, actively cooled surface of a mold cavity in an Engel (Engel Austria GmbH) 300-ton vertical injection-molding machine. Sabic (Saudi Basic Industries Corporation) OQ3820-1111 optical grade polycarbonate was injected at normal molding conditions against the inner surface of the wafer to fill the mold cavity designed to produce an eyewear 6B single vision semi-finished lens blank.

The eyewear lens blank was removed from the mold cavity and inspected. The outer surface of the lens (which was also the outer surface of the wafer) showed excessive haze, crazing and micro-cracking. Upon moderate rubbing with a dry cloth, the tint could be partially wiped off the outer surface. Visual inspection of the lens blank showed that a gradient tint had been achieved due to the dyes on the inner surface of the wafer.

Tint was not visible on the outer mold of the molding cavity during this short experiment, but the inventors believed that transfer could occur over extended use. As more lens blanks were molded with wafers dyed on both inner and outer surfaces (greater than about ten molding cycles), it was noted that dye had transferred to the outer mold surface, and the mold surface had to be cleaned to avoid defects on subsequent lens blanks.

Example 4

An eyewear lens blank was made in the same manner as EXAMPLE 3. The outer surface again showed crazing and micro-cracking, but was not rubbed with a cloth. Instead, this lens blank was dip coated using standard lens coating conditions with commercially available primer PR-1165 and thermally-cured coating solution MP-1179 (both from SDC Technologies Inc.). The coating applied to the lens blank was able to smooth over some of the crazing defects on the outer surface. However, tint leached into the coating solution, which would be unacceptable for subsequent coating use, and black particulate matter was observed in the coating along the edges of the lens blank.

Example 5

The wafer, dye bath and gradient tint conditions of EXAMPLE 2 were used, but the static-held protective sheet was allowed to remain on the outer surface of the wafer throughout the tinting process. After tinting, the wafer was dried in air at 80° C. for 2 hours, with the outer protective sheet still in place.

Inspection of the tinted wafer showed that the inner surface was gradient-tinted, and showed little or no crazing and micro-cracking of this surface. The outer surface had retained the protective sheet intact, and no edge penetration of dye was apparent. When the protective sheet on the outer surface was removed, there was no evidence of tint or crazing on that surface.

Example 6

Wafers were prepared according to the conditions of EXAMPLE 5. After drying, the outer protective sheet was allowed to remain in place for an hour to a few days prior to the wafer's use in injection molding.

The static-held sheet on the outer surface of the wafer was removed immediately before the gradient-tinted wafer was placed in the mold cavity. As in EXAMPLE 3, the gradient-tinted wafer was placed against the outer, actively cooled surface of a mold cavity in an Engel (Engel Austria GmbH) 300-ton vertical injection-molding machine. In this EXAMPLE 6, however, the outer surface of the wafer in contact with the mold cavity is not tinted; only the inner surface that will contact the molten polycarbonate has been gradient-tinted. Sabic (Saudi Basic Industries Corporation) OQ3820-1111 optical grade polycarbonate was injected at normal molding conditions against the inner surface of the wafer to fill the mold cavity designed for an eyewear 6B single vision semi-finished lens blank.

Multiple eyewear lens blanks were prepared for detailed evaluation of product performance.

Each lens blank was removed from the mold cavity and inspected. The outer surface of the lens blanks showed no crazing or other damage, and no tint or damage was visible on the mold cavity. A gradient tint from the tint bath dyeing of the inner surface of the wafer was clearly visible within the molded lens blanks.

The adhesion between the gradient-tinted wafer and the injection molded polycarbonate portion of the lens blank (layer 50 in FIG. 1) was evaluated by a custom adhesion test called the razor blade test. In this test, a standard single-edged razor blade is held by hand and the sharp corner point of the razor probed into the side of the lens blank at the bond between the wafer and the injection-molded polycarbonate. Significant hand-applied force is exerted to drive the razor edge into the lens blank, and the tester's other hand is protected by a cut-resistant glove. Damage, such as chipping away of lens material or delamination of the polarized layer or the wafer from the lens blank, results in a lower score on this adhesion test. The adhesion was tested for four lens blanks of EXAMPLE 6. Each rated 4 out of 5 points possible, showing less than 1 mm sections of delamination when probed vigorously by the razor blade. Ratings of 3 to 5 are deemed acceptable adhesion.

Example 7

A lens blank was prepared in the same manner as EXAMPLE 6 (with gradient tint applied only to the inner surface of the wafer), and dip coated in the same manner as EXAMPLE 4.

A gradient tint from the dyeing of the inner surface of the wafer was clearly visible within the molded lens blank. The lens blank appeared evenly coated in the standard dip coating process, comparable to a non-gradient-tinted product. Upon visual inspection, no tint was leached into the coating solution and no particulate matter was visible. The coating adhesion was evaluated with the cross-hatch tape test (ASTM D3359), and rated as a pass (no coating loss or less than 1 square of coating removal in the cross-hatched area).

Example 8

Lens blanks were prepared in the same manner as EXAMPLE 6, with gradient tint applied only to the inner surface of the wafer prior to injection molding. In this example, a different commercially available hard coating was applied to the outer surface of the injection-molded lens blanks. A primerless UV-cured 1175 coating from SDC Technologies Inc. was applied onto the surface of each lens blank by spin coating and cured by timed exposure to UV light following standard optical lab lens coating procedures.

Adhesion of the hard coating to the lens was again evaluated by cross-hatch tape testing, as in EXAMPLE 7. For EXAMPLE 8, in addition to primary adhesion, the lens blanks were also subjected to immersion in boiling deionized water and the coating adhesion evaluated by fresh cross-hatch tape tests at 1, 2, and 3 hour intervals.

The gradient-tinted lens blank samples rated a pass for initial coating adhesion, and each passed after further testing following one, two and three hours of boiling the lens blank. Good coating adhesion is indicated, even under extreme conditions.

Example 9

Lens blanks were prepared in the same manner as EXAMPLE 6, with gradient tint applied only to the inner surface of the wafer prior to injection molding, except that extra care was taken to ensure that optimal injection molding conditions within the normal operating range were used. This was achieved by performing an initial measurement of sphericity and cylinder values at the center of the outer surface on test-molded lens blanks. Measurements were performed on freshly molded lens blanks using a Focovision by Reflection SR-2 instrument (Automation and Robotics). The measured values are compared with expected average values and if they are not within the standard range, the molding parameters of hold pressure and/or cycle time are increased within their normal operating range to improve conformity of the lens blank to the mold cavity.

Twenty-four lens blanks were prepared by the optimized molding conditions of Example 9. To check for warp in these lens blanks due to the additional process steps involved in gradient tinting, additional measurements were made using the Focovision by Reflection SR-2 instrument. Spherical power and cylinder measurements were recorded at the center of each lens blank, and at four additional points located 10 mm out from the center at 0°, 90°, 180° and 270° around the lens blank. The optical quality, as measured by these cylinder and spherical values and their range of values, was comparable to standard polarized polycarbonate lens blank production, within the accepted values for finished lenses of the ophthalmic industry as set out in ANSI Z80.1: 2010 "American National Standard for Ophthalmics-Prescription Spectacle lenses," and met the tight tolerances of ISO 10322-1: 2006 "Ophthalmic Optics—Semi-Finished Spectacle Lens Blanks, Part 1: Specifications for single vision and multifocal blanks." Warp was not detected even with these additional optical power measurements.

Example 10-11

The conditions of wafer tinting and lens blank preparation described in EXAMPLES 5 and 6 were repeated, but with a different wafer stock material, supplied by Sumitomo Bakelite Co., Ltd. as YG42. This wafer stock has a three-layer construction like that of EXAMPLE 1, but has different polarizing properties (color and transmittance) and additionally, is supplied as a large flat sheet rather than as spherically curved round wafers of 76 mm diameters. The flat sheet was cut at Younger Mfg. Co. into round, flat wafers 76 mm in diameter, and for these EXAMPLES 10-11, the inventors chose to use the wafers without further curving or shaping before injection molding.

For convenience, one sheet was used for all the wafers of EXAMPLES 10-11, and the two polycarbonate layers that comprised the opposite sides of the sheet were marked "A" and "B" to allow tracking of polycarbonate layer differences (if any) in the resultant wafer. The gradient tint was applied, using the apparatus and method described previously. In each case, the static-held protective sheet was allowed to remain on the outer surface of the wafer during tinting, such that only the inner surface 400 or layer 40 of the wafer was gradient-tinted. However, half the wafers were tinted with "A" being the inner layer 40 of the resultant wafer 70, and half with "B" as the inner layer 40.

EXAMPLES 10-11 test if differences between the polycarbonate layers of the wafer affect their gradient tinting and final performance. These two examples also allow comparison between the performances of two different wafer stocks: this flat sheet material and the other wafers of EXAMPLES 1-9.

Lens blanks were injection-molded using the conditions of EXAMPLE 6 (with the gradient-tinted surface of each wafer being positioned as the wafer's inner surface in the injection molding cavity). The alternative hard coating of EXAMPLE 8 was applied to lens blanks from each of EXAMPLES 10 and 11 for evaluation of coating processing and adhesion.

In EXAMPLES 10 and 11, adhesion between the wafer and the injection-molded polycarbonate material was assessed by another, alternative test method. For this adhesion test, the inner surface 500 of the lens blank is ground and polished to a +4D spherical optical power. This type of plus power lens configuration removes most of the material at the perimeter of the lens blank to create an extremely thin lens edge (sometimes referred to as a knife edge) with a much larger center thickness. Typically, this grinding and polishing process will cut into the wafer at the edge of the lens blank, and expose portions of the interface between the wafer and the injection-molded polycarbonate, and possibly different layers of the wafer itself, to the mechanical actions and stresses of grinding and polishing. The resultant lens is visually inspected for separation, chipping, fraying and delamination indicative of insufficient adhesion between the wafer and the injection-molded material, or within the wafer itself. Any damage due to the grinding and polishing process is ranked on a 1-5 scale, with 5 equating to excellent adhesion and no visible damage seen on the ground and polished inner surface. Successively lower ratings are given if damage extends 1 mm or more at any spot, or damage occurs in multiple locations on the inner lens surface.

Adhesion of the hard coating to the lens was again evaluated by cross-hatch tape testing, as in EXAMPLE 7. For these EXAMPLES 10-11, in addition to primary adhesion, the lens blanks were subjected to immersion in boiling water and the coating adhesion evaluated by fresh cross-hatch tape tests after boiling for 1, 2, and 3 hour intervals, as in EXAMPLE 8.

The variables of these experiments and the results are summarized in the Table below.

| Example | Surface(s) subjected to gradient tint and position on the wafer | Visual appearance of outer surface (in lens blank) | Visual appearance of wafer's inner surface (within lens blank) | Adhesion of wafer with lens blank on 1-5 scale (5 = excellent) | Coating adhesion (initial/1/2/3 hr boil results) P = pass, F = fail |
|---|---|---|---|---|---|
| 10 | A, inner only | good | good | 5 | P/P/P/P |
| 11 | B, inner only | good | good | 5 | P/P/P/P |

EXAMPLES 10-11 demonstrate that the invention can yield good results for more than one type of wafer. The EXAMPLES further demonstrate that eyewear lens products made by the invention can perform well with different typical lens coatings and attain acceptable results with various tests for lens performance.

Although the invention has been disclosed in detail with reference to preferred embodiments, and multiple variations or derivatives of these embodiments, one skilled in the art will appreciate that additional substitutions, combinations, and modifications are possible without departing from the concept and scope of the invention. These and similar variations would become clear to one of ordinary skill in the art after inspection of the specification and the drawings herein. Accordingly, the invention is identified by the following claims.

What is claimed is:

1. A tinted, polarized eyewear lens product comprising:
   a) a multilayer wafer comprising an outer transparent polymeric layer, an inner transparent polymeric layer, and a polarized layer positioned between the inner and the outer polymeric layers, wherein of said inner and outer transparent polymeric layers, only the inner transparent polymeric layer is tinted; and
   b) an injection-molded polycarbonate inner portion directly fused to the inner, tinted transparent polymeric layer of the multilayer wafer.

2. The tinted, polarized eyewear lens product as defined in claim 1, wherein the inner transparent polymeric layer is tinted with a gradient tint.

3. The tinted, polarized eyewear lens product as defined in claim 2, wherein:
   the gradient tint is darkest at the top of the lens product when viewed in an as-worn position; and
   the polarized layer comprises a linear polarizer with its absorption axis aligned along the horizontal axis of the tinted, polarized eyewear lens product.

4. The tinted, polarized eyewear lens product as defined in claim 2, wherein the multilayer wafer further comprises a photochromic material.

5. The tinted, polarized eyewear lens product as defined in claim 1, wherein the multilayer wafer further comprises additives selected from the group consisting of dyes, tints, UV absorbers, UV reflectors, UV stabilizers, thermal stabilizers, IR reflectors, visible light filters, selective light reflectors, and selective light absorbers.

6. The tinted, polarized eyewear lens product as defined in claim 5, wherein the polarized layer further comprises a photochromic material.

7. The tinted, polarized eyewear lens product as defined in claim 1, wherein the inner transparent polymeric layer comprises polycarbonate.

8. The tinted, polarized eyewear lens product as defined in claim 1, wherein the multilayer wafer further comprises a photochromic material.

9. The tinted, polarized eyewear lens product as defined in claim 1, wherein the multilayer wafer comprises a circular polarizer.

10. The tinted, polarized eyewear lens product as defined in claim 1, further comprising a coating selected from the group consisting of hard coatings, anti-reflective coatings, photochromic coatings, and light-filtering coatings.

11. A gradient-tinted, dyed eyewear lens product comprising:
    a) a multilayer wafer comprising an outer transparent polymeric layer, an inner transparent polymeric layer, and a dyed layer positioned between the inner and the outer polymeric layers, wherein the inner transparent polymeric layer has is the only layer with a gradient tint; and
    b) an injection-molded polycarbonate inner portion directly fused to the inner transparent polymeric layer of the multilayer wafer.

12. The gradient-tinted, dyed eyewear lens product as defined in claim 11, wherein the dyed layer comprises a photochromic material.

13. The gradient-tinted, dyed eyewear lens product as defined in claim 11, wherein the dyed layer comprises constant tints.

14. The gradient-tinted, dyed eyewear lens product as defined in claim 11, wherein the inner transparent polymeric layer comprises polycarbonate.

15. The gradient-tinted, dyed eyewear lens product as defined in claim 11, wherein the multilayer wafer further comprises a photochromic material.

16. A method of making a gradient-tinted polarized eyewear lens product comprising the steps of:
    a) obtaining a multilayer wafer comprised of at least one outer transparent polymeric layer, an inner transparent polycarbonate layer, and a polarized layer positioned between the inner and outer transparent layers;
    b) applying a gradient tint only to an inner surface of the inner transparent polycarbonate layer to create a gradient-tinted surface;
    c) placing the multilayer wafer against a cooled mold surface of an injection-molding cavity such that the gradient-tinted surface is located on the side opposite the mold surface; and
    d) injecting molten polycarbonate directly against the gradient-tinted surface of the wafer to form an inner portion of the lens product, wherein the injection-molded polycarbonate fuses to the inner transparent polycarbonate layer of the wafer.

17. The method of making a gradient-tinted polarized eyewear lens product as defined in claim 16, wherein the multilayer wafer further comprises a photochromic material.

18. The method of making a gradient-tinted polarized eyewear lens product as defined in claim 16, wherein the multilayer wafer further comprises at least one additive selected from the group consisting of dyes, tints, UV absorbers, UV reflectors, UV stabilizers, thermal stabilizers, IR reflectors, visible light filters, selective light reflectors, and selective light absorbers.

19. The method of making a gradient-tinted polarized eyewear lens product as defined in claim 16, wherein the method further comprises a step of applying one or more coatings selected from the group consisting of hard coatings, anti-reflective coatings, photochromic coatings, and light-filtering coatings.

20. The method of making a gradient-tinted polarized eyewear lens product as defined in claim 16, wherein the multi-layer wafer comprises a circular polarizer.

* * * * *